United States Patent
Kim

(10) Patent No.: US 11,598,787 B2
(45) Date of Patent: Mar. 7, 2023

(54) WHEEL SPEED SENSOR FOR VEHICLE

(71) Applicant: HYUNDAI MOBIS CO., LTD., Seoul (KR)

(72) Inventor: Sung A Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/485,881

(22) Filed: Sep. 27, 2021

(65) Prior Publication Data

US 2022/0349914 A1 Nov. 3, 2022

(30) Foreign Application Priority Data

Apr. 28, 2021 (KR) .................. 10-2021-0055099

(51) Int. Cl.
 *G01P 3/48* (2006.01)
 *G01P 3/487* (2006.01)
 *B60T 17/22* (2006.01)

(52) U.S. Cl.
 CPC ............. *G01P 3/487* (2013.01); *B60T 17/221* (2013.01)

(58) Field of Classification Search
 CPC .................................. G01P 3/487; G01P 3/489
 See application file for complete search history.

(56) References Cited

U.S. PATENT DOCUMENTS

| | | | | |
|---|---|---|---|---|
| 10,495,485 B2 * | 12/2019 | Burdette | ............ | G01P 3/489 |
| 10,866,117 B2 * | 12/2020 | Kozomora | ............ | G01R 33/098 |
| 2018/0174441 A1 * | 6/2018 | Hainz | ............ | G08C 19/16 |
| 2021/0080480 A1 * | 3/2021 | Tomita | ............ | G01D 5/12 |

FOREIGN PATENT DOCUMENTS

| | | | |
|---|---|---|---|
| KR | 10-2004-0009439 A | 1/2004 | |
| KR | 10-2008-0007616 A | 1/2008 | |
| WO | WO-2016128175 A2 * | 8/2016 | ............ B60T 13/662 |

OTHER PUBLICATIONS

Office Action dated Nov. 7, 2022 in the corresponding Korean Patent Application No. 10-2021-0055099.

* cited by examiner

*Primary Examiner* — Reena Aurora
(74) *Attorney, Agent, or Firm* — NovoTechIP International PLLC

(57) ABSTRACT

A wheel speed sensor for a vehicle may include: a rotating part; an encoder unit mounted on the rotating part, and rotated by the rotating part; a plurality of sensing units configured to sense a signal from the encoder unit; and a compensation unit disposed between the sensing unit and the encoder unit, and configured to compensated or offset the signal from the encoder unit.

11 Claims, 4 Drawing Sheets

WHEEL SPEED SENSOR FOR VEHICLE

CROSS-REFERENCE TO RELATED APPLICATIONS

This application claims priority from and the benefit of Korean Patent Application No. 10-2021-0055099, filed on Apr. 28, 2021, which is hereby incorporated by reference for all purposes as if set forth herein.

BACKGROUND OF THE INVENTION

1. Field of the Invention

Exemplary embodiments of the present disclosure relate to a wheel speed sensor for a vehicle, and more particularly, to a wheel speed sensor for a vehicle, which can compensate or offset the waveform of an encoder, such that a plurality of sensors sense the same signal, thereby preventing a measurement error.

2. Discussion of Related Art

In general, a main brake refers to a device that decelerates or stops a vehicle in operation. As the main brake used in a vehicle, a friction brake has been used. The friction brake performs braking by changing kinetic energy of the vehicle in operation into thermal energy through a mechanical friction device and radiating the friction heat into the atmosphere.

The main brake for a vehicle uses an ABS (Anti-lock Brake System) in order to secure a handling quality by controlling brake hydraulic pressure and to improve braking performance by reducing a stopping distance, in case of sudden braking or braking on a slippery road. The ABS is roughly constituted by a hydraulic unit which controls hydraulic pressure supplied to a wheel cylinder according to a control signal from an ECU and a sensing unit which senses a rotation state of a wheel.

The sensing unit that senses the rotation state of a wheel is generally referred to as a wheel speed sensor, and the wheel speed sensor senses the speed of each wheel using a hall IC chip. The wheel speed sensor is an important factor of an ABS/ESP (Electronic Stability Program), and provides important information for controlling other vehicle parts.

The wheel speed sensor is coupled to a back plate of a brake assembly, and configured to sense the rotation state of each wheel during driving, by sensing the rotation of a pulse ring located in the back plate.

In the related art, however, since the rotation of each wheel is measured by one sensor, a measurement error may occur in case that a sensor fault or damage occurs. Therefore, there is a need for a device capable of solving the problem.

The related art of the present disclosure is disclosed in Korean Patent Application Publication No. 2004-0009439 published on Jan. 31, 2004, and entitled "Method of Detecting Vehicle Speed Using Speed Sensor".

BRIEF SUMMARY OF THE INVENTION

Various embodiments are directed to a wheel speed sensor for a vehicle, which can compensate or offset the waveform of an encoder, such that a plurality of sensors sense the same signal, thereby preventing a measurement error.

In an embodiment, a wheel speed sensor for a vehicle may include: a rotating part; an encoder unit mounted on the rotating part, and rotated by the rotating part; a plurality of sensing units configured to sense a signal from the encoder unit; and a compensation unit disposed between the sensing unit and the encoder unit, and configured to compensate or offset the signal from the encoder unit.

The encoder unit may be a multi-pole pair magnetic pulse ring in which a plurality of N poles and a plurality of S poles are alternately arranged.

The encoder unit may be a gear made of a ferromagnetic material.

The sensing unit may include: a first parallel sensing part configured to sense the signal from the encoder unit; and a second parallel sensing part disposed on one side of the first parallel sensing part, and configured to sense the signal from the encoder unit with a time difference from the first parallel sensing part.

The compensation unit may be mounted on any one of the first and second parallel sensing parts, and compensate or offset the signal from the encoder unit so as to remove the time difference between the first and second parallel sensing parts.

The sensing unit may include: a first serial sensing part configured to sense the signal from the encoder unit; and a second serial sensing part disposed above the first serial sensing part, and configured to sense the signal from the encoder unit at the same time as the first serial sensing part.

The compensation unit may be mounted in any one of the first and second serial sensing parts, and compensates or offsets the signal from the encoder unit such that the first and second parallel sensing parts have the same amplitude.

The sensing unit may include: one or more fixed sensing housings; and a pair of sensing chips embedded in the sensing housing, and configured to sense the signal from the encoder unit, wherein any one of the pair of sensing chips measures the signal compensated or offset by the compensation unit.

The compensation unit may be removably mounted in the sensing housing.

The pair of sensing housings may be disposed so as to be spaced apart from each other, and the pair of sensing chips may be embedded in the respective sensing housings.

The pair of sensing chips may be disposed in the one sensing housing so as to be spaced apart from each other.

In the wheel speed sensor for a vehicle in accordance with the embodiment of the present disclosure, the compensation unit may compensate or offset a signal from the encoder unit, such that the plurality of sensing units acquire the same measured value even though the positions of the sensing units with respect to the compensation unit are different from each other. Therefore, the wheel speed sensor can precisely measure the vehicle speed, and rapidly determine a measurement error.

DETAILED DESCRIPTION OF THE INVENTION

Hereinafter, a wheel speed sensor for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
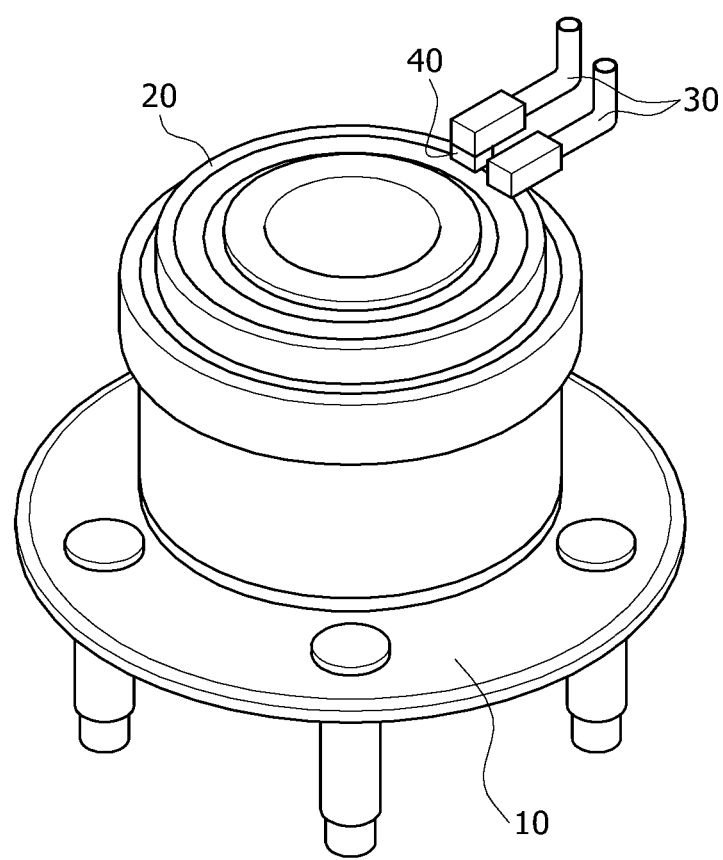
FIG. 1 is a diagram schematically illustrating a wheel speed sensor for a vehicle in accordance with an embodiment of the present disclosure.

FIG. 1 is a diagram schematically illustrating a wheel speed sensor for a vehicle in accordance with an embodiment of the present disclosure. Referring to FIG. 1, a wheel speed sensor 1 for a vehicle in accordance with an embodiment of the present disclosure includes a rotating part 10, an encoder unit 20, a sensing unit 30 and a compensation unit 40.

The rotating part 10 is rotated with a wheel. For example, the rotating part 10 may be a bearing that fixes a rotating shaft of a wheel to a predetermined position, and rotates the rotating shaft while supporting the weight of the rotating shaft and a load applied to the rotating shaft. Besides, the rotating part 10 may be a wheel on which a tire is mounted.

The encoder unit 20 is mounted on the rotating part 10, and rotated by the rotating part 10. More specifically, the encoder unit 20 may be a multi-pole pair magnetic pulse ring in which a plurality of N poles and a plurality of S poles are alternately disposed. For example, the encoder unit 20 may have 43 to 80 pole pairs. The encoder unit 20 may be a rubber magnetic encoder, and include a magnetic material corresponding to at least any one of ferrite, NdFeB and Sm—Co. Besides, the encoder unit 20 may be a tone wheel to which a gear made of a ferromagnetic material is applied.

The encoder unit 20 may have a single track, double tracks or tipple tracks. The encoder unit 20 may be configured as a single-layer multi-pole pair magnetic pulse ring when having a single track, and configured as a two or three-layer multi-pole pair magnetic pulse ring when having double tracks or triple tracks. Such two or three-layer multi-pole pair magnetic pulse rings may have different multi-pole pair arrangements and/or different thicknesses. Since the encoder unit 20 is configured as multi-pole pair magnetic pulse rings having different multi-pole pair arrangements and/or different thicknesses, the sensing unit 30 may precisely measure the rotation speed of the wheel.

The plurality of sensing units 30 sense a signal from the encoder unit 20. For example, two sensing units 30 may be disposed in parallel or vertically stacked. The sensing unit 30 may measure the rotation speed and direction of the rotating part 10, i.e. the rotation speed and direction of the wheel, by sensing a change in magnetic field, which is caused by the encoder unit 20 rotated by the rotating part 10. The plurality of sensing units 30 may be connected on one board.

The compensation unit 40 is disposed between the sensing unit 30 and the encoder unit 20, and compensates or offsets the signal from the encoder unit 20. That is, the values measured by the plurality of sensing units 30 are different from one another, because the measurement positions of the sensing units 30 with respect to the encoder unit 20 are different from one another. However, the compensation unit 40 may compensate or offset the signal from the encoder unit 20, such that the plurality of sensing units 30 can acquire the same measured value. Therefore, the plurality of sensing units 30 can individually measure the magnetic field, which makes it possible to sense an operation error between the encoder unit 20 and each of the sensing units 30, and to rapidly check whether the sensing unit 30 is normally operated.

Figure 2:
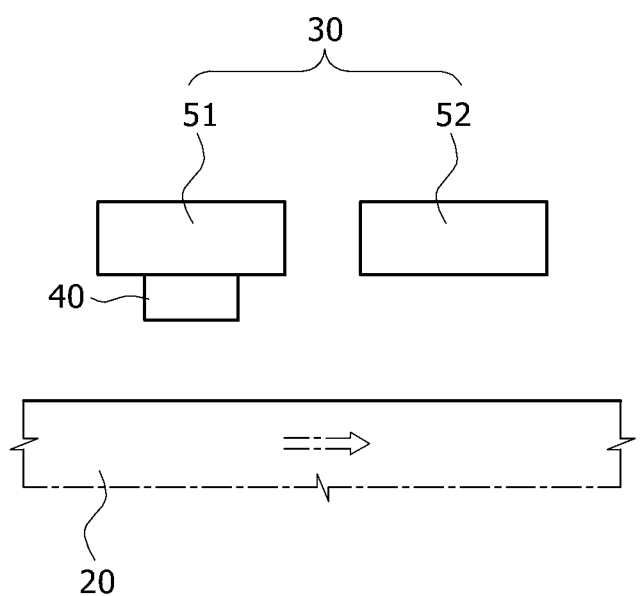
FIG. 2 is a diagram schematically illustrating a sensing unit in accordance with a first embodiment of the present disclosure.

FIG. 2 is a diagram schematically illustrating a sensing unit in accordance with a first embodiment of the present disclosure. Referring to FIG. 2, the sensing unit 30 in accordance with the first embodiment of the present disclosure includes a first parallel sensing part 51 and a second parallel sensing part 52. The first parallel sensing part 51 and the second parallel sensing part 52 each sense a signal from the encoder unit 20. At this time, the second parallel sensing part 52 is disposed on one side of the first parallel sensing part 51. Thus, based on the rotation direction of the encoder unit 20, the first parallel sensing part 51 first measures the signal, and then the second parallel sensing part 52 measures the signal. Therefore, since the first and second parallel sensing parts 51 and 52 sense the signal from the encoder unit 20 with a time difference therebetween, the sensed frequencies have a constant amplitude, but have a time difference therebetween. Such a structure can measure a correct amplitude because the first and second parallel sensing parts 51 and 52 maintain a constant distance from each other.

The compensation unit 40 is mounted on any one of the first and second parallel sensing parts 51 and 52, and compensates or offsets the signal from the encoder unit 20 such that no time difference occurs between the frequencies measured by the first and second parallel sensing parts 51 and 52. Thus, the first and second parallel sensing parts 51 and 52 may measure the same amplitude in the same time zone. For example, the compensation unit 40 may include a ferromagnetic material to stabilize or convert a magnetic field waveform.

Figure 3:
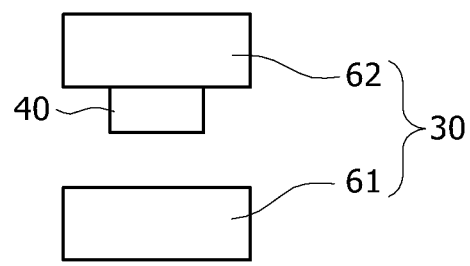
FIG. 3 is a diagram schematically illustrating a sensing unit in accordance with a second embodiment of the present disclosure.
Figure 3:
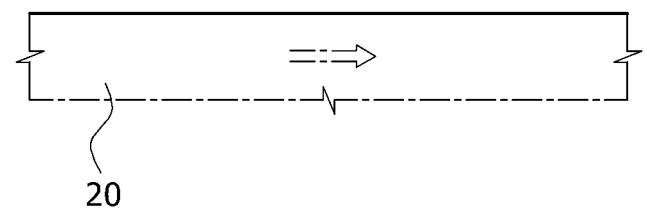

FIG. 3 is a diagram schematically illustrating a sensing unit in accordance with a second embodiment of the present disclosure. Referring to FIG. 3, the sensing unit 30 in accordance with the second embodiment of the present disclosure includes a first serial sensing part 61 and a second serial sensing part 62. The first serial sensing part 61 and the second serial sensing part 62 each sense a signal from the encoder unit 20. At this time, the second serial sensing part 62 is disposed above the first serial sensing part 61. Thus, based on the rotation direction of the encoder unit 20, the first and second serial sensing parts 61 and 62 simultaneously measure a signal. Therefore, although the first and second serial sensing parts 61 and 62 sense the signal from the encoder unit 20 at the same time, the sensed frequencies may have different amplitudes because the distances between the first and second serial sensing parts 61 and 62 and the encoder unit 20 are different from each other. Such a structure may check values outputted by the first and second serial sensing parts 61 and 62 in the same time zone, and rapidly determine whether the first and second serial sensing parts 61 and 62 are normally operated.

The compensation unit 40 is mounted on any one of the first and second serial sensing parts 61 and 62, and compensates or offsets the signal from the encoder unit 20 such that the frequencies measured by the first and second serial sensing parts 61 and 62 have the same amplitude. For example, the compensation unit 40 may include a ferromagnetic material to stabilize or convert a magnetic field waveform.

Figure 4:
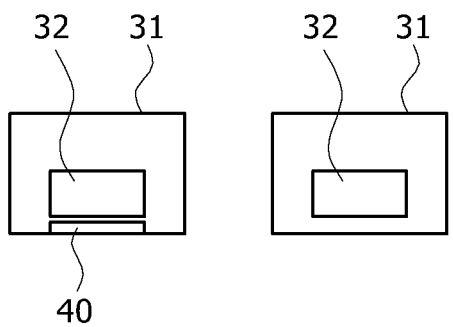
FIG. 4 is a diagram schematically illustrating the state in which a compensation unit in accordance with the first embodiment of the present disclosure is disposed.
Figure 4:
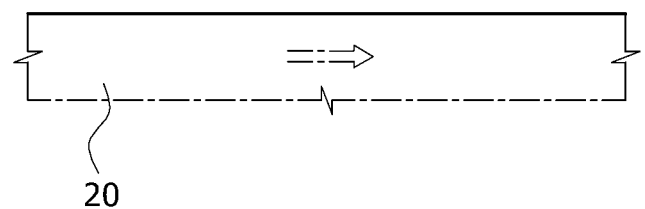
Figure 5:
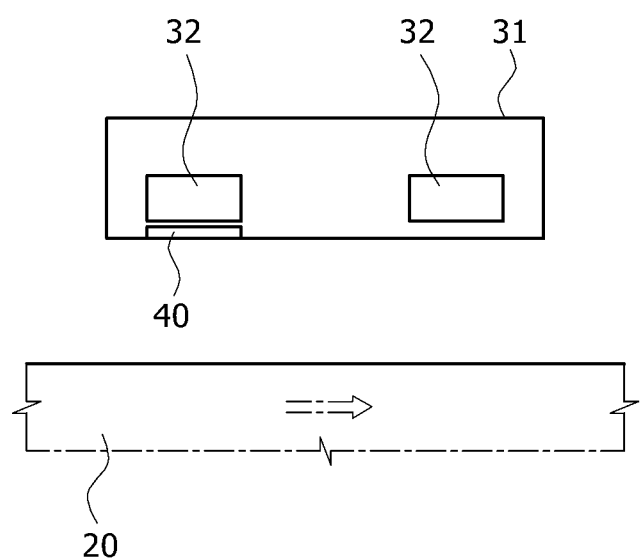
FIG. 5 is a diagram schematically illustrating the state in which a compensation unit in accordance with the second embodiment of the present disclosure is disposed.

FIG. 4 is a diagram schematically illustrating the state in which the compensation unit in accordance with the first embodiment of the present disclosure is disposed, and FIG. 5 is a diagram schematically illustrating the state in which the compensation unit in accordance with the second embodiment of the present disclosure is disposed. Referring to FIGS. 4 and 5, the compensation unit 40 in accordance with the embodiment of the present disclosure may be mounted on the bottom surface of the sensing unit 30, and removed or replaced as necessary.

The sensing unit 30 includes a pair of sensing chips 32 embedded in one or more sensing housings 31 which are fixedly installed, and senses a signal from the encoder unit 20. The compensation unit 40 may be installed on the bottom surface of the sensing housing 31, and compensate or offset the signal from the encoder unit 20. The compensation unit 40 may be screwed or hooked to the sensing housing 31, and mounted on the sensing housing 31 or separated from the sensing housing 31. Therefore, when a sensing error of the sensing unit 30 occurs due to damage to the compensation unit 40, the compensation unit 40 may be removed or replaced. Besides, even when the conversion ratio of the compensation unit 40 needs to be adjusted due to a change in external environment, the compensation unit 40 may be removed or replaced.

When the pair of sensing housings 31 are separated and disposed so as to be spaced apart from each other, the sensing chip 32 is embedded in each of the sensing housings 31. At this time, when the compensation unit 40 is mounted in any one of the two sensing housings 31, the sensing chip 32 embedded in the sensing housing 31 having the compensation unit 40 mounted therein may sense the compensated or offset signal (FIG. 4).

Besides, the pair of sensing chips 32 are disposed in one sensing housing 31 so as to be spaced apart from each other. At this time, when the compensation unit 40 is disposed to face any one sensing chip 32, the sensing chip 32 facing the compensation unit 40 may sense the signal compensated or offset by the compensation unit 40 (FIG. 5).

The installation process and the operation of the wheel speed sensor for a vehicle in accordance with the embodiment of the present disclosure, which has the above-described structure, will be described as follows.

When the two sensing units 30 are installed in parallel to each other (see FIG. 2), the compensation unit 40 is mounted on any one of the two sensing units 30. In such an installation state, a time difference occurs when the two sensing units 30 measure the signal from the encoder unit 20. Thus, the measured values of the sensing units 30 are different from each other. The compensation unit 40 is disposed between the sensing unit 30 and the encoder unit 20, and compensates or offsets a signal from the encoder unit 20, which is to be sensed by the sensing unit 30. Thus, any one of the sensing units 30, which has received the virtual signal compensated or offset by the compensation unit 40, may acquire the same measured value as that measured by the other sensing unit 30 in the same time zone.

When the two sensing units 30 are stacked in serial to each other (see FIG. 3), the compensation unit 40 is mounted in any one of the two sensing units 30. In such an installation state, the values measured by the two sensing units 30 are different from each other due to a difference in measurement distance between the two sensing units 30 and the encoder unit 20. The compensation unit 40 is disposed between the sensing unit 30 and the encoder unit 20, and compensates or offsets a signal from the encoder unit 20, which is to be sensed by the sensing unit 30. Thus, any one of the sensing units 30, which has received the virtual signal compensated or offset by the compensation unit 40, may acquire the same measured value as the amplitude measured by the other sensing unit 30.

In the wheel speed sensor 1 for a vehicle in accordance with the embodiment of the present disclosure, the compensation unit 40 may compensated or offset a signal from the encoder unit 20, such that the plurality of sensing units 30 acquire the same measured value even though the positions of the sensing units 30 with respect to the compensation unit 40 are different from each other. Therefore, the wheel speed sensor 1 can precisely measure the vehicle speed, and rapidly determine a measurement error.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A wheel speed sensor for a vehicle, comprising:
   a rotating part;
   an encoder unit mounted on the rotating part, the rotating part configured to rotate the encoder unit;
   a plurality of sensing units including first and second sensing units spaced apart from each other, the first sensing unit configured to sense a signal from the encoder unit; and
   a compensation unit disposed between the encoder unit and the second sensing unit and configured to compensate the signal from the encoder unit, wherein the second sensing unit is configured to sense the compensated signal.

2. The wheel speed sensor of claim 1, wherein the encoder unit comprises a multi-pole pair magnetic pulse ring including a plurality of N poles and a plurality of S poles arranged alternately.

3. The wheel speed sensor of claim 1, wherein the encoder unit comprises a gear made of a ferromagnetic material.

4. The wheel speed sensor of claim 1, wherein:
   the first sensing unit is configured to sense the signal from the encoder unit at a first time; and
   the second sensing unit is disposed on a side of the first sensing unit to sense the signal from the encoder unit at a second time that is different from the first time.

5. The wheel speed sensor of claim 4, wherein the compensation unit is connected to the second sensing unit and configured to compensate, based on a time difference between and the first and second times, the signal from the encoder unit.

6. The wheel speed sensor of claim 1, wherein: the second sensing unit is positioned above the first sensing unit to sense the signal from the encoder unit at the same time as the first serial sensing part senses the signal from the encoder unit.

7. The wheel speed sensor of claim 6, wherein the compensation unit is connected to the second sensing unit and configured to compensate, based on a distance between the first and second sensing units, the signal from the encoder unit.

8. The wheel speed sensor of claim 1, further comprising one or more sensing housings configured to contain the plurality of sensing units, wherein the first sensing unit comprises a first sensing chip, and the second sensing unit comprises a second sensing chip.

9. The wheel speed sensor of claim 8, wherein the compensation unit is removably disposed in the sensing housing.

10. The wheel speed sensor of claim 8, wherein:
the one or more sensing housings comprise first and second sensing housings spaced apart from each other, and
the first and second sensing chips are disposed in the first and second sensing housings, respectively.

11. The wheel speed sensor of claim 8, wherein:
the one or more sensing housings comprise a single sensing housing, and
the first and second sensing chips are spaced apart from each other within the single sensing house.

\* \* \* \* \*